Aug. 7, 1923.

T. C. LAZIER 1,464,324

DRYING APPARATUS FOR DISCRETE MASSES

Original Filed Sept. 27, 1919

Thomas C. Lazier
Inventor

By his Attorney

Patented Aug. 7, 1923.

1,464,324

UNITED STATES PATENT OFFICE.

THOMAS C. LAZIER, OF BELLEVILLE, CANADA, ASSIGNOR, BY MESNE ASSIGNMENTS, TO NATURAL AIR DRYERS, INC., A CORPORATION OF DELAWARE.

DRYING APPARATUS FOR DISCRETE MASSES.

Application filed September 27, 1919, Serial No. 326,799. Renewed December 7, 1921. Serial No. 520,694.

*To all whom it may concern:*

Be it known that I, THOMAS C. LAZIER, a citizen of the Dominion of Canada, residing in the city of Belleville, Canada, have invented a certain Improvement in Drying Apparatus for Discrete Masses, of which the following is a specification.

In certain United States patents to Seymour W. Bonsall, and notably in his Patent Number 1,047,734, there are described and claimed certain forms of rotary driers depending for operation upon the principle of subjecting the materials to be dried to the action of a current of air which is compressed by being forced through narrow passages between the surfaces of the articles to be dried. The various driers of this type hitherto proposed have been particularly adapted to the drying of boards, veneer and the like, which are capable of being fixed in one position, thus forming the reduced air passages within which the compressed air draft is made to operate.

My present invention relates to apparatus adapted to utilize the air currents produced by the action of rotating air scoops in drying discrete masses of relatively small particles. My apparatus is especially useful in drying wood chips for the manufacture of paper pulp, as well as for drying hops, beans, grasses, seeds, copra, bagasse, cane tops, moss, peat, vines, and various food products, and indeed any other material which will not mash or break up under treatment.

My apparatus comprises essentially a tumbling cage for holding the chips or other discrete material to be dried combined with an air scoop adapted to lead air into the cage, the whole being mounted upon a substantially horizontal shaft in such a manner as to be capable of rapid rotary motion. This rotation operates through the action of the air scoop to lead into and through the tumbling cage a powerful drying air current, while at the same time the rotation of the cage causes its contents to tumble about, constantly exposing new surfaces to the direct action of the desiccating air stream.

In practice, of course, the combined cage and scoop will be duplicated, and two or more of such combinations will be carried upon a common mounting in such a way as to balance the entire apparatus.

Figure 1:
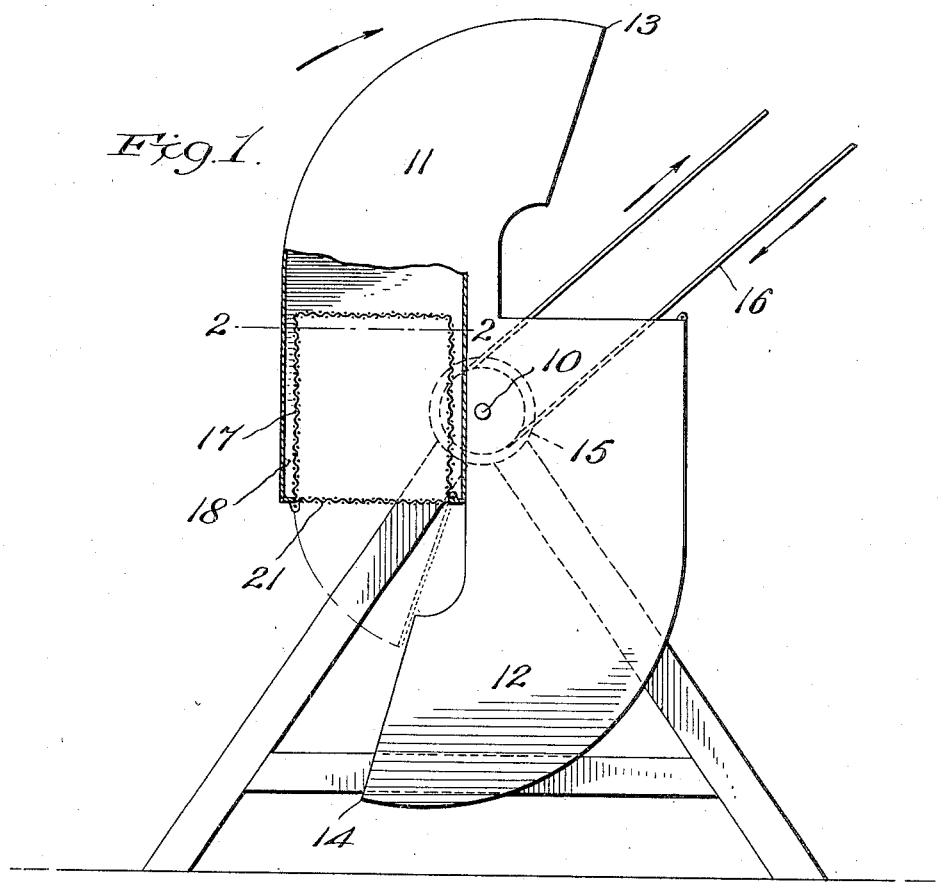
Figure 2:
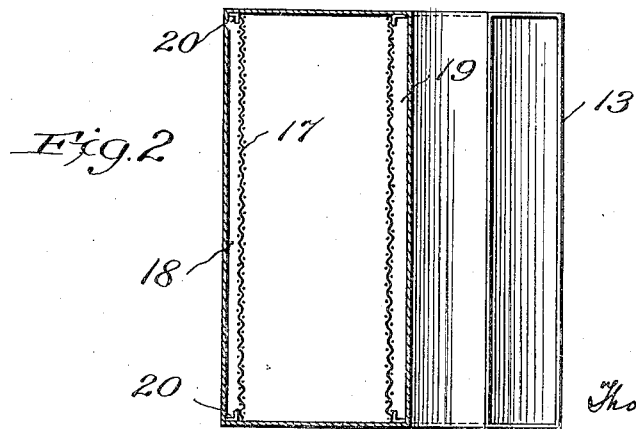

My invention is illustrated in a preferred form in the accompanying drawings, wherein Figure 1 is a side elevation of my drier, a portion being removed to show the location of the cage, and Figure 2 shows one passage in cross section on the line $x$—$x$ in Figure 1 looking upward, the further end of the cage being omitted for clearness.

At 10 is shown the supporting shaft, on opposite sides of which are fixed two boxes 11 and 12 made with thin walls, forming flues or air passages cut off squarely at the rear extremities and terminating in curved scoops at 13 and 14 at the forward extremities. The boxes 11 and 12 and their contents are, of course, carefully balanced with respect to the center of revolution.

When this structure is caused to rotate upon or with the shaft 10, by means of the pulley 15 and belt 16 running as indicated by the arrows in Figure 1 (or by any other suitable driving means) the forward movement of the scoops 13 and 14 creates powerful currents of air through the boxes 11 and 12.

In order to take advantage of the drying action of these currents for the purpose already specified, I locate within the air passages or flues, back of the scoops, two tumbling cages, 17, one of which is shown in Figure 1. The other cage occupies the same position within the other box 12, and is constructed in the same way as the cage 17.

By the term "tumbling cage" I intend any receptacle suitable for holding the material to be dried, and whose walls are so constructed as to permit passage of air through the cages. As shown, I prefer to make these walls of wire netting with a mesh of a fineness suitable to the material had in view.

For promoting the better circulation of air, I prefer to leave an appreciable empty space on two faces of the cage, and these spaces are best located over the front and rear faces, as shown at 18 and 19. The ends of the cage are firmly secured to the sides of the boxes or air passages, as for instance by means of angle irons 20.

At the rear or discharging face of each cage is placed a door 21, through which the material may be loaded and unloaded. I prefer to hinge this door so that it may drop into the position shown in dotted lines in Figure 1. It thus acts to direct the falling material as it discharges so that it does not strike the scoop shaped end of the opposite box.

It will be seen that, if the cages be partly filled with the chips or other material to be dried, and the apparatus is caused to rotate in the direction above stated, the loose material will be tumbled over and over presenting all the surfaces of the particles to the action of the air currents created by the whirling scoops. The speed of rotation of the apparatus may vary greatly according to the judgment of the operator. It should be sufficient to create a powerful air current, while not so great as to cause the particles to assume a fixed position against the outer wall of the cage under the influence of centrifugal force.

Various changes may be made in my improved apparatus without departing from the scope of my invention, and I do not limit myself to the details herein shown and described.

What I claim is:

1. A drier for masses of discrete material comprising a tumbling cage, an air scoop adapted to lead an air current to said cage, and a substantially horizontal revoluble mounting for said cage and scoop.

2. A drier for masses of discrete material comprising a plurality of balanced tumbling cages, balanced scoops adapted to lead air currents to said cages respectively, and a substantially horizontal revoluble mounting for said cages and scoops.

3. A drier for masses of discrete material comprising a substantially horizontal revoluble mounting, two opposed balanced air passages carried on opposite sides of said mounting, an air scoop at the entrance to each air passage, and a tumbling cage in each air passage.

4. Apparatus of the character set forth in claim 3 hereof wherein air spaces are provided on two opposite sides of each tumbling cage.

5. Apparatus of the character set forth in claim 3 hereof, wherein each tumbling cage is provided with a door at its rear end.

6. Apparatus of the character set forth in claim 3 hereof, wherein each scoop opens nearly opposite to the exit end of the opposite air passage and wherein each tumbling cage is provided with a door adapted to swing down into position to divert the dried material from the opposite scoop as it is discharged.

7. A drier for masses of discrete material comprising a tumbling cage and means for causing a current of air to pass through the same.

8. A drier for masses of discrete material comprising a tumbling cage and means operated by revolution of said cage to cause a current of air to pass through the same.

In testimony whereof I have hereto set my hand on this 23rd day of September, 1919.

THOMAS C. LAZIER.